United States Patent [19]
Engardio et al.

[11] Patent Number: 6,099,123
[45] Date of Patent: Aug. 8, 2000

[54] PRODUCTION OF PHOTOPOLYMERIZED POLYESTER HIGH INDEX OPHTHALMIC LENSES

[75] Inventors: Thomas J. Engardio, Vista; Philip D. Dalsin, Carlsbad, both of Calif.

[73] Assignee: Signet Armorlite, Inc., San Marcos, Calif.

[21] Appl. No.: 08/923,508

[22] Filed: Sep. 4, 1997

[51] Int. Cl.$^7$ .................................................... G02C 7/02
[52] U.S. Cl. .......................... 351/177; 351/159; 264/1.1; 264/496; 522/18; 522/28; 522/42; 522/64; 522/107
[58] Field of Search ................ 522/107, 18, 28, 522/42, 64; 264/1.1, 496; 351/159, 177

[56] References Cited

U.S. PATENT DOCUMENTS

| | | | |
|---|---|---|---|
| 2,884,398 | 4/1959 | Thomas et al. | 260/29.8 |
| 3,391,224 | 7/1968 | Sherr et al. | 260/872 |
| 3,513,224 | 5/1970 | Sherr | 260/872 |
| 3,513,225 | 5/1970 | Sherr | 260/872 |
| 3,650,669 | 3/1972 | Osborn et al. | 8/115.5 |
| 3,806,079 | 4/1974 | Beattie | 249/126 |
| 4,139,578 | 2/1979 | Baughman et al. | 260/871 |
| 4,166,088 | 8/1979 | Neefe | 264/1 |
| 4,178,327 | 12/1979 | Hall et al. | 525/169 |
| 4,257,988 | 3/1981 | Matos et al. | 264/1.1 |
| 4,265,723 | 5/1981 | Hesse | 525/20 |
| 4,507,432 | 3/1985 | Banno et al. | 525/21 |
| 4,522,993 | 6/1985 | Sasagawa et al. | 526/292.4 |
| 4,544,572 | 10/1985 | Sandvig et al. | 427/44 |
| 4,611,892 | 9/1986 | Kawashima et al. | 351/159 |
| 4,622,382 | 11/1986 | Fischer et al. | 528/295.3 |
| 4,632,969 | 12/1986 | Sasagawa et al. | 526/286 |
| 4,650,845 | 3/1987 | Hegel | 526/261 |
| 4,689,387 | 8/1987 | Kajimoto et al. | 528/76 |
| 4,721,377 | 1/1988 | Fukuda et al. | 351/159 |
| 4,728,469 | 3/1988 | Danner et al. | 264/1.4 |
| 4,740,070 | 4/1988 | Vance | 351/163 |
| 4,774,035 | 9/1988 | Carmelite et al. | 264/1.4 |
| 4,785,064 | 11/1988 | Hegel | 526/261 |
| 4,851,471 | 7/1989 | Maltman et al. | 524/719 |
| 4,919,850 | 4/1990 | Blum et al. | 265/1.4 |
| 4,973,640 | 11/1990 | Matsuda et al. | 526/323.1 |
| 5,028,358 | 7/1991 | Blum | 264/1.4 |
| 5,049,321 | 9/1991 | Galic | 264/1.4 |
| 5,077,326 | 12/1991 | Shibata et al. | 523/523 |
| 5,132,384 | 7/1992 | Matsuda et al. | 526/321 |
| 5,202,366 | 4/1993 | Reid et al. | 523/516 |
| 5,254,643 | 10/1993 | Takiyama et al. | 525/445 |
| 5,319,007 | 6/1994 | Bright | 523/516 |
| 5,395,566 | 3/1995 | Kobayakawa et al. | 252/586 |
| 5,422,046 | 6/1995 | Tarshiani et al. | 264/1.38 |
| 5,516,468 | 5/1996 | Lipscomb et al. | 265/1.38 |
| 5,531,940 | 7/1996 | Gupta et al. | 264/1.7 |
| 5,621,017 | 4/1997 | Kobayakawa et al. | 522/16 |
| 5,880,170 | 3/1999 | Imura | 522/107 |

FOREIGN PATENT DOCUMENTS

| | | |
|---|---|---|
| 1059683 | 7/1979 | Canada . |
| 1117691 | 2/1982 | Canada . |
| 0 007 086 A1 | 1/1980 | European Pat. Off. . |
| 0 376 662 | 7/1990 | European Pat. Off. . |
| 0 453 149 | 10/1991 | European Pat. Off. . |
| 2 273 827 | 1/1976 | France . |
| WO 90/05061 | 5/1990 | WIPO . |
| WO 93/21010 | 10/1993 | WIPO . |

OTHER PUBLICATIONS

Boenig, Herman V., "Unsaturated Polyesters: Structure And Properties", Elsevier Publishing Company, 1964, pp. 38–54.

Database WPI—Derwent Publications Ltd., London, GB; AN 94–080018 & JP. A. 06 032 846 (Nippon Oils & Fats Co. Ltd.) Feb. 8, 1994—see abstract.

Database WPI—Derwent Publications, Ltd., London, GB; AN 91–032018 & JP. A. 02 300 221 (Nippon Oils & Fats Co. Ltd.) Dec. 12, 1990—see abstract.

*Primary Examiner*—Patricia A. Short
*Attorney, Agent, or Firm*—Marshalll, O'Toole, Gerstein, Murray & Borun

[57] ABSTRACT

Unsaturated polyester resin-based ophthalmic lens compositions that are modified for unexpected improvement in speed of manufacture while maintaining uniform, low optical distortion and/or improved tint speed by the addition to the polyester composition of at least one photoinitiator, preferably having at least some activity at a wavelength above about 380 nm so that a UV-absorbing compound can be included in the polyester lens composition, and the polyester resin composition is photocured to gelation in about 7 minutes or less, e.g., using a light intensity of at least about 300 microwatts/cm$^2$, more preferably at least about 500 microwatts/cm$^2$, most preferably at least about 1,000 microwatts/cm$^2$.

72 Claims, No Drawings

PRODUCTION OF PHOTOPOLYMERIZED POLYESTER HIGH INDEX OPHTHALMIC LENSES

FIELD OF THE INVENTION

The present invention is directed to unsaturated polyester resin-based compositions and methods of manufacturing and using polymeric articles, and coatings therefrom, manufactured in a short period of time without optical distortion, using at least one photoinitiator and actinic radiation for photopolymerization. The compositions and methods are especially useful in the manufacture of ophthalmic lenses. More particularly, the present invention is directed to photopolymerized unsaturated polyester-based polymeric articles, particularly unsaturated polyester-based ophthalmic lenses, that have improved optical uniformity (or lower optical distortion) and increased tint speed, while maintaining "water-white" color over time. The lenses are characterized by a relatively high index of refraction (at least about 1.5 and preferably at least about 1.56) and relatively low density, particularly below about 1.3 grams/cc, e.g., 1.25 grams/cc. The resulting lenses have improved optical uniformity and preferably include ultraviolet light absorbency while exhibiting a "water-white" color. The advantage of photocuring the lens lies in the short length of time needed to achieve complete cure and associated manufacturing cost benefits.

BACKGROUND OF THE INVENTION AND PRIOR ART

Plastic materials have been used for the manufacture of ophthalmic lenses for many years. Plastics offer advantages to the patient over glass, most noticeably in their lower densities, allowing for a lighter lens, and greater impact strength. Conversely, plastic lenses can exhibit disadvantages: they tend to scratch more easily, have higher levels of chromatic aberration (lower ABBE values), and may distort at higher temperature processing conditions, due to lower glass transition (Tg) temperatures, resulting in "warped" lenses, or lenses with high levels of optical distortion. Additionally, plastic lenses usually have lower index of refraction values when compared to glass, which tends to require lenses of increased thickness and reduced cosmetic appeal. The standard "CR-39" type lens, made from diethylene glycol bis(allyl carbonate), has an index of refraction of 1.498.

Advances in technology have allowed improvements in plastic lens performance. Coatings have been developed which impart improved scratch resistance. Some plastics have relatively high ABBE values which are adequate for minimizing the effects of chromatic aberration. Improvements in machining and optical lens processing equipment and processes have permitted the use of materials having lower glass transition temperatures. Plastics with higher indices of refraction, and physical lens design improvements, have helped improve the cosmetic appeal of plastic lenses.

While these improvements have helped the plastic lens gain acceptance in the marketplace, to a point where plastic lenses constitute a majority of lens eyewear in the U.S., increasing expectations for performance have dictated that good ophthalmic lenses have the following key properties:

Clarity and Color

Lenses which are "hazy" are obviously unacceptable to the patient. Color is also of concern both from the standpoint of having a "water-white" quality for best cosmetic appeal when the lens is first purchased, as well as maintenance of that color over time, e.g., being resistant to the effects of sunlight, which over time can cause the lens to turn yellow.

Optical Distortion

Lack of optical distortion requires a material having a relatively high ABBE number such that chromatic aberration is minimized; and, more importantly, a material having excellent uniformity in composition such that the occurrence of visible "waves" is minimized.

Rapidly Tintability

Many ophthalmic lenses are manufactured in semi-finished form and shipped to optical laboratories where the prescription is "ground in". With ever increasing emphasis on short optical lab turn-around times, e.g., 1 hour service, the ability of the lens material to rapidly accept fashion tints is important. In the case of semi-finished lens products, the front surface of the lens may have a scratch resistant coating which does not accept tint. Thus, the only route for tinting to occur may be the parent lens material on the back surface. This material must be tintable.

High Index of Refraction and Low Density

The higher the index of refraction, the thinner the finished lens will be for a given design. This higher index, especially when combined with a relatively low density, will allow for the manufacture of "thinner and lighter" lens products.

Over the past several years, plastic ophthalmic lenses have been fabricated from a variety of materials including polycarbonate and polymethylmethacrylate, as well as polymerized allylic compounds, epoxies, and urethanes. The most common plastic ophthalmic lens, however, is made from diethylene glycol bis(allyl carbonate) often referred to as "CR-39" (a specific product manufactured by PPG Industries). As previously mentioned, this material has a refractive index of 1.498. It is easily processed in optical laboratories, is able to be manufactured with low optical distortion and is readily tinted by various commercially available tinting dyes.

The use of polyester materials to produce ophthalmic lenses has been previously disclosed in various U.S. patents. Examples of such disclosures are U.S. Pat. Nos. 3,391,224, 3,513,224 and published PCT application WO 93/21010. U.S. Pat. No. 3,391,224 discloses a composition in which a polyester is combined with from 5 to 20 weight percent methyl methacrylate and less than 5 weight percent styrene to produce a thermosetting product which can be used to produce an ophthalmic lens. U.S. Pat. No. 3,513,224 discloses a composition in which 70 to 75 weight percent of a specific unsaturated polyester formed from the reaction of fumaric acid with triethylene glycol and 2,2-dimethyl-1,3-propanediol (otherwise known as neopentyl glycol) is combined with about 12 to 18 weight percent styrene and 8 to 12 weight percent ethylene glycol dimethacrylate. The styrene raises the index of refraction to approximately 1.52, and the ethylene glycol dimethacrylate reduces brittleness of the polymer.

A number of commercially available unsaturated polyester resins have been developed which are clear when cast and have a refractive index of approximately 1.56 (the high index being primarily attributable to the use of styrene as a cross-linking diluent monomer at a level of approximately 30 to 45 weight percent). For clarity, the terms "polyester resin" and "unsaturated polyester resin", shall mean the polyester resin only, without considering any amount of diluent monomer, such as styrene, that typically is included with the polyester resin when purchased. Likewise, when considering the percent by weight of polyester resin in the compositions disclosed throughout this patent, the percentages are calculated as polyester only, without considering any diluent monomer. The densities of the various polyester systems are also quite low (on the order of 1.25 grams/cc). These properties are superior to CR-39 (index of 1.498 and density of 1.32 grams/cc) with regard to the potential to make "thinner and lighter" lenses.

Polyester resins can be manufactured using different compositions to achieve a wide variety of physical properties (hard, soft, rigid, flexible, and the like). Typical commercial polyesters include those made from a variety of glycols and acids. Common glycols used in alkyd polyester synthesis include: ethylene glycol, diethylene glycol, propylene glycol, dipropylene glycol, neopentyl glycol, and the like. Common acids used include: phthalic anhydride, isophthalic acid, adipic acid, and the like, used in conjunction with maleic anhydride and/or fumaric acid to provide unsaturation for cross-linking, usually with styrene or other diluent monomers.

Resins made using phthalic anhydride are commonly called "ortho resins"; those made with isophthalic acid are commonly referred to as "iso resins". With respect to properties desirable for making ophthalmic lenses, typical iso resins which have good scratch resistance are generally quite slow to tint. Typical ortho resins, on the other hand, are generally more scratch-prone, but tint more readily. Unsaturated polyester resins can demonstrate a propensity to polymerize somewhat non-uniformly causing internal optical distortion or visible "waves".

Polymerization of the polyester resin can be carried out in a number of ways. Quite common is the use of a system promoted with a material such as cobalt octoate or cobalt naphthenate. When used with methyl ethyl ketone peroxide, the system can be cured near room temperature. Other free radical polymerization techniques also can be used, including thermal curing, for example, using peroxides or diazo compounds, as well as photoinitiated curing using compounds selected from the following classes of photoinitiators: benzoin ethers, benzophenones, thioxanthones, ketals, benzyl dialkyl ketals, α-hydroxy ketones, substituted morpholino ketones, acetophenones, phosphine oxides, xanthones, and visible light photoinitiators, including: (a) fluorone dye/onium salt amine systems, (b) dye/borate systems, and (c) borate photoinitiators. Previously, photoinitiated curing of polyesters has been performed primarily for uses other than ophthalmic lenses so that optical distortion was not a concern. Osborn U.S. Pat. No. 3,650,669 discloses photopolymerization of polyesters, for purposes other than ophthalmic lenses, using high intensity light radiation.

Among the problems associated with casting and curing ophthalmic lenses by means of free-radical polymerization of various compounds is the maintenance of the above-described key properties of the lens. These key properties, particularly the "water-white" color for cosmetic appeal and stability of that color over time (e.g., being resistant to the effects of sun exposure), lack of optical distortion (i.e., the occurrence of visible "waves" is minimized), and tintability, are essential for commercial acceptance. Additionally, consumer advantages can be obtained if the lens can be made absorbent to ultraviolet light. Materials with a high index of refraction and low density will allow for the manufacture of "thinner and lighter" lens products.

Formulations based on unsaturated polyester resins can be utilized to produce high index, low density ophthalmic lenses. Low levels of optical distortion and good tint and color characteristics can be attained when the resin is modified with certain co-monomers and an exotherm depressant to improve tint speed and reduce optical distortion, as disclosed in my parent patent application.

The control of exotherm by means of gradual dissipation of the heat of polymerization has been regarded as being essential to obtaining good optical uniformity. The addition of an exotherm depressant to the polyester formulation, as disclosed in my parent application, helps to slow the rate of reaction, allowing for gradual dissipation of heat and the avoidance of "hot spots" and convection currents which result in optical distortion as the formulation gels and solidifies during cure. In other less reactive lens casting formulations, such as those incorporating diethylene glycol bis (allyl carbonate), or "CR-39", the slowing of the reaction is commonly achieved by adjustment of the cure cycle for a given initiator level. The beginning part of the cure cycle tends to be at a relatively low temperature and is nearly constant or slightly increasing in temperature during the initial stages of polymerization and gelation. Gelation usually occurs in about 0.5 to 1 hour, with the initial stage of polymerization being quite lengthy, typically, 1 to 6 hours. The complete cure cycle is usually 7 to 20 hours.

In experimentation leading to the present invention, initial attempts to replace a thermal polymerization initiator with a photoinitiator resulted in a lens that was yellow in color and/or had a high degree of optical distortion. Efforts to rotate the cast mold assemblies to provide the polyester with homogeneous light exposure over its entire surface did not solve the color or distortion problems. Attempts at using low intensity bulbs of short and long wavelengths also did not solve the optical distortion problem. Attempts to increase the exotherm depressant, found to be necessary for thermal curing of the composition to reduce optical distortion, e.g., α-methyl styrene, surprisingly worsened the optical distortion problem. As a result of these surprising results, eventually, and contrary to the teachings of the prior art, attempts were made to photocure the polyester as fast as possible, by eliminating the ce-methyl styrene exotherm depressant and using a relatively high intensity light source, e.g., 300 microwatts/cm$^2$, 500 microwatts/cm$^2$ and higher. Quite surprisingly, it was found that when the unsaturated polyester resins of the present invention were photocured very quickly, e.g., gelled in about 7 minutes or less, preferably in about 5 minutes or less, as defined by a gel test described in detail to follow, e.g., by using a relatively high intensity bulb, the completed lens actually had less striation or optical distortion, and the lens was harder and more scratch resistant, with less stress in the lens.

The compositions described here are curable in less than about 3 hours, preferably less than about 2 hours, most preferably less than about 1 hour.

SUMMARY OF THE INVENTION

In brief, the present invention is directed to unsaturated polyester resin-based ophthalmic lens compositions that are modified for unexpected improvement in speed of manufacture while maintaining uniform, low optical distortion and/or improved tint speed by the addition to the polyester composition of at least one photoinitiator, preferably having at least some activity at a wavelength above about 380 nm so that a UV-absorbing compound can be included in the polyester lens composition, and photocuring the polyester resin quickly, achieving gelation in about 7 minutes or less, preferably, for example, using a light intensity of at least about 300 microwatts/cm$^2$ over wavelengths that the photoinitiator absorbs and generates free radicals, more preferably at least about 500 microwatts/cm$^2$, most preferably at least about 1,000 microwatts/cm$^2$.

Accordingly, one aspect of the present invention is to provide unsaturated polyester resin-based compositions, and methods of rapidly photocuring the polyester-based compositions to achieve gelation of the polyester-based composition in about 7 minutes or less, preferably in about 5 minutes or less, while providing uniform, low levels of optical distortion.

Another aspect of the present invention is to provide unsaturated polyester resin-based compositions, and methods of photocuring the polyester-based compositions, wherein the composition includes a photoinitiator having activity above about 380 nm, and rapidly photocuring the composition to achieve gelation of the polyester as defined in a gel test, infra, in about 7 minutes or less, preferably achieving gelation in about 5 minutes or less, more preferably achieving gelation in about 3 minutes or less, most preferably in about 1 minute or less. Complete curing of the polyester-based composition is achieved in about 2 hours or less, preferably in about 1 hour or less, more preferably in about 15–30 minutes, without significant optical distortion.

Another aspect of the present invention is to provide a method of manufacturing ophthalmic lenses by photopolymerizing and photocuring a polyester resin-based composition within a mold cavity, said composition containing at least one photoinitiator, and using a minimum light intensity of about 300–500 microwatts/cm$^2$, preferably greater than about 1,000 microwatts/cm$^2$ at effective wavelengths for the photoinitiator (at wavelengths where the photoinitiator generates free radicals).

Another aspect of the present invention is to provide a method of manufacturing ophthalmic lenses by photopolymerizing and photocuring a polyester resin-based composition within a curved mold cavity, wherein the composition includes a photoinitiator having activity (generating free radicals) at wavelengths above about 380 nm for initiating polymerization of the polyester; and a UV absorber capable of absorbing UV light at wavelengths of about 380 nm or below, so that the finished lens will absorb ultraviolet light and have improved color.

The unexpected result obtained in the photoinitiated polyester formulation described herein, is that the successful production of lenses with low levels of optical distortion is achieved in a process that includes very rapid polymerization and high levels of exotherm, causing rapid temperature increase, e.g., 5° F. per minute. Attempts to slow the polymerization rate, such as by the use of exotherm depressants, can actually worsen the optical uniformity. The time to gel in the system described is less than about 7 minutes, preferably less than about 6 minutes and most typically 1 minute or less, and produces lenses with good uniformity. Complete cure is obtained in approximately three hours or less, preferably one hour or less, most typically about 15 to 30 minutes. Semifinished lens thicknesses up to approximately 16 mm have been cast successfully within these time frames.

The above and other aspects and advantages of the present invention will become more apparent from the following detailed description of the preferred embodiments of the present invention.

DETAILED DESCRIPTION OF THE PREFERRED EMBODIMENTS

The compositions of the present invention include an unsaturated polyester resin in an amount of about 25% to about 70% (excluding monomer diluents, e.g., styrene) or about 40% to about 95% if calculated to include a diluent monomer, e.g., styrene; of the composition, preferably about 35% to about 60% by weight unsaturated polyester calculated without diluent monomer. Unsaturated polyesters are well known and can be manufactured by the reaction of one or more polyols with one or more polycarboxylic acids, with olefiic unsaturation being provided by one or more of the reactants, usually the acid. The resultant unsaturation in the polyester enables these resins to form thermosetting, cross-linked reaction products with compounds that contain olefinic double bonds, such as styrene, methyl methacrylate, and the like. Commercially available unsaturated polyesters which can be used in accordance with the present invention include the reaction products of one or more saturated or unsaturated dicarboxylic acids, or their ester-forming derivatives, with a saturated or a vinyl-group-containing polyhydric alcohol.

Examples of suitable unsaturated dicarboxylic acids include maleic acid, fumaric acid, citraconic acid, itaconic acid, meconic acid, and anhydrides thereof, lower alkyl esters or acid halides thereof.

Examples of suitable saturated dicarboxylic acids include aliphatic dicarboxylic acids, such as malonic acid, succinic acid, glutaric acid, adipic acid, suberic acid, azelaic acid, pimelic acid, or sebacic acid; and aromatic dicarboxylic acids, such as orthophthalic acid, terephthalic acid, isophthalic acid, m,p-diphenyl dicarboxylic acid, and diphenic acid; and anhydrides of these acids, such as phthalic anhydride and maleic anhydride, lower alkyl esters or acid halides of these acids, and mixtures thereof.

Examples of suitable polyols include ethylene glycol, propylene glycol, butylene glycols, neopentyl glycol, dipropylene glycol, and the poly(ethylene glycol)s of the foregoing, such as diethylene glycol, triethylene glycol, tetraethylene glycol, and mixtures thereof.

The base polyester resin used in the compositions and methods of the present invention should have a number average molecular weight in the range of about 1,000 to about 5,000, preferably about 1,500 to about 4,000, and should be without haze. Suitable unsaturated polyesters having such properties are well known in the art.

As examples of suitable unsaturated polyester resins, the base polyester can be a polyester formed by the reaction of propylene glycol, phthalic anhydride and maleic anhydride, such as the "S40" unsaturated polyester disclosed in Bright U.S. Pat. No. 5,319,007. The composition disclosed in the Bright patent includes a phenoxyethyl acrylate, which is preferably not included as an acrylate additive in accordance with the present invention. Another suitable unsaturated polyester is formed by the reaction of maleic anhydride, orthophthalic anhydride and propylene glycol, such as "Aropol L-2506-15" of Ashland Chemical Co., also disclosed in the above-identified Bright U.S. Pat. No. 5,319,007.

The preferred polyester resins useful in accordance with the present invention include the reaction products of one or more acids or anhydrides selected from phthalic acid, isophthalic acid, maleic acid, phthalic anhydride, maleic anhydride, and particularly mixtures of two or more of such acids or anhydrides, with a polyol selected from ethylene glycol, propylene glycol, diethylene glycol, dipropylene glycol, and neopentyl glycol, preferably two or more of those glycols, having a number average molecular weight in the range of about 1,500 to about 4,000.

One of the most difficult problems encountered in attempting to formulate a polyester resin-based composition into a suitable ophthalmic lens formulation is that of providing the cast and cured composition with sufficient optical clarity, or freedom from optical distortion. In conventional procedures for the casting of plastic ophthalmic lenses, the reactants used to form the resin are introduced between spaced apart glass or metal mold surfaces. The mold sections are sealed together about their inner periphery by means of a non-reactive, resilient gasket or retainer ring. Since exothermic materials are employed, the mold outer surfaces are immersed in a cooling fluid, e.g., water, or otherwise cooled to dissipate the heat of polymerization and cross-linking from the mold cavity, and to maintain an optimum polymerization and curing temperature. During the polymerization reaction, particularly prior to gelation and cross-linking, convection currents are created in the resin, while the resin is in the liquid state, as a result of a substantial temperature differential between the polymerizing resin in the mold cavity and the coolant that surrounds the mold. These convection currents tend to freeze into the polymer as polymerization proceeds through gelation and curing, resulting in striation or visible "waves" in the cured polyester resin. Lenses that contain such visible "waves" are unacceptable due to extensive optical distortion or optical nonuniformity.

The problem of obtaining rapid and uniform photocure while simultaneously providing relatively high levels of ultraviolet absorbency needed for customers desiring a UV cutoff (e.g., less than 5% transmission at 380 nm wavelength for a semifinished lens processed to 1.5 mm thickness) and improved weathering characteristics is solved in accordance with a preferred embodiment of the present invention by the use of photoinitiators having at least some activity at wavelengths above 380 nm. Photoinitiators that are active at a wavelength above 380 nm include benzoyl phosphine oxides; xanthones and thioxanthones; visible light photoinitiators, including: (a) fluorone dye/onium salt/amine systems, (b) dye/borate systems, and (c) borate photoinitiators; benzyl dialkyl ketals; and substituted morpholino ketones. In this manner, UV absorbers capable of absorbing light at wavelengths of 380 nm and below will provide the desired UV cutoff, while the photoinitiator(s) having activity at wavelengths above 380 nm will be activated (generate free radicals) for rapid and uniform photocure of the polyester resin. Preferred initiators include phosphinates, phosphine oxides, particularly substituted phosphine oxides, and mixtures of one or more phosphinates and/or phosphine oxides with α-hydroxy ketones, such as: 2,4,6-trimethylbenzoyl-diphenylphosphine oxide (BASF Lucirin TPO); ethyl 2,4,6-trimethylbenzoylphenylphosphinate (BASF Lucirin LR 8893X); bis(2,6-dimethoxybenzoyl)-2-4-,4-trimethylpentyl phosphine oxide; bis(2,4,6 trimethylbenzoyl)phenyl phosphine oxide; a 50%/50% by weight mixture of 2,4,6-trimethylbenzoyl-diphenylphosphine oxide and 2-hydroxy-2-methyl-1-phenyl-propan-1-one (Ciba Darocur 4265); a 25%/75% by weight mixture of bis(2,6-dimethoxybenzoyl)-2-4-,4-trimethylpentyl phosphine oxide and 2-hydroxy-2-methyl-1-phenyl-propan-1-one (Ciba Irgacure 1700); a 25%/75% by weight mixture of bis(2,6-dimethoxybenzoyl)-2-4-,4-trimethylpentyl phosphine oxide and 1-hydroxycyclohexyl phenyl ketone (Ciba CGI 1800); and a 50%/50% by weight mixture of bis(2,6-dimethyoxybenzoyl)-2-4-,4-trimethylpentyl phosphine oxide and 1-hydroxycyclohexyl phenyl ketone (CGI 1850).

Other suitable photoinitiators include 1-hydroxycyclohexyl phenyl ketone (Ciba Irgacure 184); 2-benzyl-2-N, N-dimethylamino-1-(4-morpholinophenyl)-1-butanone (Ciba Irgacure 369); a mixture of 50% by weight 1-hydroxy cyclohexyl phenyl ketone and 50% by weight benzophenone (Ciba Irgacure 500); 2,2-dimethyoxy-2-phenyl acetophenone (Ciba Irgacure 651); 2-methyl-1-[4-(methylthio)phenyl]-2-morpholino propan-1-one (Ciba Irgacure 907); 2-hydroxy-2-methyl-1-phenyl-propan-1-one (Ciba Darocur 1173); bis(2,6-dimethoxybenzoyl)-2-4-,4-trimethylpentyl phosphine oxide (Ciba CGI 403); 4-(2-hydroxyethoxy)phenyl-2-(2-hydroxy-2-methylpropyl) ketone (Ciba Irgacure 2959); bis($\eta^5$-2,4-cyclopentadien-1-yl)-bis-[2,6-difluoro-3-(1H-pyrrol-1-yl)phenyl titanium (Ciba Irgacure 784 DC); isobutyl benzoin ether (Stauffer Vicure 10); methyl benzoylformate (Stauffer Vicure 55); a mixture of 2-butoxy-1,2-dipehnylethanone and 2-(2-methylpropoxy)-1,2-diphenylthanone (Sartomer Esacure EB3); 2,2-diethoxyacetophenone (Upjohn DEAP); 2,2-di-sec-butoxyacetophenone (Upjohn Uvatone 8301); diethoxyphenylacetophenone (Upjohn Uvatone 8302); a mixture of 70% by weight oligo 2-hydroxy-2-methyl-1-[4-(1-methylvinyl phenyl) propanone] and 30% by weight 2-hydroxy-2-methyl-1-phenyl propan-1-one (Sartomer Esacure KIP 100 F); a mixture of isopropyl thioxanthone and a photoactivator such as ethyl 4-(dimethylamino) benzoate (Sartomer Esacure ITX and Esacure EDB, respectively); a mixture of isopropyl thioxanthone and 2,4,6-trimethylbenzophenone and 4-methylbenzophenone (Sartomer Esacure X 15); a mixture of 2,4,6-trimethylbenzophenone and 4-methylbenzophenone (Sartomer Esacure TZT); a mixture of 30% by weight oligo 2-hydroxy-2-methyl-1-[4-(1-methylvinyl phenyl) propanone] and 70% by weight of a mixture of 2,4,6-trimethylbenzophenone and 4-methylbenzophenone (Sartomer Esacure KT 37); fluorone dye/onium salt/amine photoinitiator systems, such as those available from Spectra Group Ltd., and borate and dye/borate systems, such as those available from Ciba. If it is unnecessary to include a UV absorber in the polyester lenses, or if a UV absorber is included that absorbs light having a wavelength cutoff below 380 nm, polymerization can be initiated with any of the above-mentioned photoinitiators, particularly the benzoin ethers; hydroxyl alkyl phenyl ketones; substituted acetophenones; and the sulfonic esters of alpha-hydroxy benzoin derivatives. The use of such photoinitiators in a formulation made to be very reactive, such that the amount of photoinitiator can be minimized, helps to reduce coloration of the lens during cure. Together with trace amounts of a blue and red dye, the lens can be made to be "water-white".

In addition to the photoinitiator(s), it has been found that the unsaturated polyester composition, in the preferred embodiment, also includes an additive selected from the group consisting of an allylic ester, an acrylate monomer, and mixtures thereof, to provide improved tint speed and/or improved optical uniformity. Any low color allylic ester and/or any low color acrylate monomer or oligomer is suitable as an optional additive in accordance with the preferred embodiment of the present invention.

Suitable allylic esters include monoallylic esters, diallylic esters and triallylic esters, preferably an allylic ester selected from the group consisting of diallyl phthalate; diethylene glycol bis(allyl carbonate); triallyl cyanurate; diallyl diphenate; and mixtures thereof. Other suitable allylic esters include allyl acrylate; allyl benzene; triallyl isocyanurate; diallyl maleate; diallyl diglycollate; dimethallyl maleate; allyl benzoate; diallyl adipate; and mixtures thereof. The allylic ester, when incorporated as a composition additive, should be included in an amount in the range of about 1% to about 20%, based on the total weight of the polyester-based lens composition, preferably about 2% to about 10% by weight; and more preferably about 4% to about 10% by weight, with best results achieved at about 4% to about 8% by weight.

Improvements in optical distortion and/or speed of tinting can be achieved by optionally including in the polyester composition either an allylic ester or an acrylate monomer. Best results are achieved with a combination of an allylic ester and an acrylate monomer, particularly since the allylic ester also functions to increase the impact strength of the cross-linked polymer network, and the acrylate additionally functions to increase the abrasion resistance.

Suitable acrylic monomers include monoacrylates, diacrylates, triacrylates, tetraacrylates, pentaacrylates, and the higher poly-functional acrylates. The preferred acrylate monomer is selected from the group consisting of methyl methacrylate; ethylene glycol diacrylate; ethylene glycol dimethacrylate; polyethylene glycol diacrylate; polyethylene glycol dimethacrylate; 1,6 hexanediol diacrylate; ethoxylated bisphenyl A diacrylate; ethoxylated bisphenyl A dimethacrylate; trimethylolpropane polyoxyethylene triacrylate; dipentaerythritol pentaacrylate; bis(4-methacryloylthiophenyl) sulfide and mixtures thereof.

Other suitable monofunctional acrylates include alkyl and substituted alkyl acrylates and methacrylates, such as ethyl acrylate; cyclohexyl methacrylate; 2-hydroxyethyl methacrylate; 3-hydroxypropyl acrylate; and mixtures thereof. Additional suitable monofunctional acrylates and methacrylates include any haloalkyl acrylate and methacrylate, such as alpha-bromoethyl acrylate; alpha-chloroethyl acrylate; chloromethyl methacrylate; 2-bromoethyl methacrylate; and mixtures thereof.

Aryl acrylates and methacrylates also are suitable as optional additives for the polyester-based compositions, such as 2-naphthyl methacrylate; para-tolyl acrylate; and mixtures thereof. Also suitable are the haloaryl acrylates and methacrylates, such as para-chlorophenyl methacrylate; meta-bromophenyl acrylate; 2,4,6-tribromophenyl acrylate; and mixtures thereof. The benzyl acrylates and methacrylates which can be used as composition additives, in accordance with the present invention, include benzyl acrylate; benzyl methacrylate and their derivatives, such as para-chlorobenzyl methacrylate; meta-methoxybenzyl methacrylate; para-ethylbenzyl acrylate; and mixtures thereof.

Other suitable polyfunctional acrylates and methacrylates include the polyol diacrylates and dimethacrylates, such as neopentyl glycol diacrylate; polyethylene glycol acrylates, methacrylates, and dimethacrylates, such as the diethylene glycols, trimethylene glycols, tetraethylene glycols, and the like; thiodiethylene glycol dimethacrylate; and mixtures thereof. Additional useful polyfunctional acrylates and methacrylates include the polyol polyacrylates and polymethacrylates, such as pentaerythritol triacrylate; glycerol triacrylate; trimethylolpropane triacrylate; tris(2-hydroxyethyl) isocyanurate trimethacrylate; and the aliphatic and aromatic monofunctional and polyfunctional urethane acrylates and methacrylates; and mixtures thereof.

The acrylate monomer, when incorporated into the polyester composition, should be included in an amount in the range of about 1% to about 50%, based on the total weight of the polyester-based lens composition, preferably about 2% to about 40% by weight; and more preferably about 5% to about 35% by weight, with best results achieved at about 10% to about 25% by weight.

The resulting lens will have a relatively high index of refraction (approximately 1.56), a relatively low density (approximately 1.24 grams/cc), and an acceptable ABBE value (approximately 34 to 37). The lens will have sufficient hardness to be able to be surfaced with commonly used optical laboratory equipment. Additionally, by the addition of various ultra-violet absorbing materials capable of absorbing UV radiation having a wavelength below about 380 nm (such as Cyanamid Cyasorb UV5411; Ciba Geigy Tinuvin 234; and the like) and color-correcting dye(s), the lens can be made "water white" and will not appreciably yellow during exposure to sunlight.

Activating the photoinitiator, in accordance with the preferred embodiment, is accomplished using radiation with wavelengths above 380 nm, but below that wavelength at which the photoinitiators are no longer active. For the system described, an emission line of approximately 405 nm (such as that obtained by a Fusion Systems "V" bulb) is very satisfactory.

Intensity of the UV light is one parameter that can be varied over a wide range to produce the rapid reaction and exotherm such that optical uniformity is achieved. Optical uniformity in polyester lenses can be obtained using the photocuring and photoinitiator(s) of the present invention so long as the polyester-based composition gels in about 7 minutes or less, preferably in about 5 minutes or less, and typically in about 1 minute or less. A number of other parameters can be varied while achieving gelation within about 7 minutes including the peak exotherm temperature; time to reach peak exotherm temperature; time that the composition is photopolymerized and photocured with the UV light; photoinitiator concentration; whether or not an exotherm depressant is included in the composition (and its concentration); and the wavelength cutoff of the UV absorber (at a lower wavelength cutoff, less UV light intensity is required since the absorber blocks less UV light). Preferably, a light intensity of at least about 300 microwatts/$cm^2$ is used to achieve rapid gelation, more preferably about 500 microwatts/$cm^2$ to about 7,000 microwatts/$cm^2$. Also, it is preferred that the time to reach peak exotherm temperature (which preferably is higher than about 150° F., more preferably at least about 250° F. as measured by the exotherm temperature measurement described, infra) be less than about 1 hour, more preferably less than about 45 minutes, most preferably less than about 30 minutes.

A suitable formulation for a semi-finished lens is comprised of:

| Component | Weight % |
| --- | --- |
| Unsaturated polyester resin (Silmar D-910 containing 30% styrene diluent) | 77.54 (w/diluent) (54.3 polyester) |
| Diallyl phthalate | 7.71 |
| Ethylene glycol dimethacrylate | 6.00 |
| Methyl methacrylate | 3.77 |
| Styrene | 4.68 |
| Cyasorb UV-5411 | 0.10 |
| Tinuvin 234 | 0.08 |
| Darocur 4265 | 0.12 |
| Blue dye | trace |
| Red dye | trace |
| α-methyl styrene | 0 |

The resin, Silmar D-910, is a clear, unsaturated polyester ortho resin intermediate formed from the reaction of phthalic anhydride, maleic anhydride, propylene glycol, ethylene glycol and diethylene glycol with a number average molecular weight of about 2,200. It contains approximately 30% by weight styrene as a diluent monomer. The polyester resin serves as the basis for the formulation.

The other ingredients perform the following functions: Diallyl phthalate is added to increase tintability of the final lens product. Ethylene glycol dimethacrylate is used to promote rapid curing, and together with methyl methacrylate, contributes to the overall hardness of the lens. Styrene is added to adjust the index of refraction and as a diluent monomer for further viscosity reduction. Cyasorb UV-5411 and Tinuvin 234 are used for conveying strong ultraviolet absorbency to the final lens product and to improve weathering characteristics of the lens. Darocur 4265 is the photoinitiator and has some reactivity at wavelengths above 380 nm. The blue and red dyes are used to adjust the final lens to a "water-white" color.

The components of the formulation are thoroughly mixed, with precaution taken to shield the mixing vessel from bright light. After filtration through a 1 micron filter, the formulation is poured into the lens mold assembly. Since many of the components are quite volatile, precautions must be taken to avoid much evaporation during the pouring process. The lens assembly consists of two glass molds separated by a gasket composed of a material chemically resistant to the formulation. Glass molds, through which the curing radiation will pass, should be transparent and free from markings or other conditions which would interfere with light transmission through the formulation.

The lens assembly is then exposed to the curing radiation. The composition disclosed will cure best from a source of light with sufficient intensity in the wavelength region of 380 nm to 430 nm. A Fusion Systems, Inc. type "V" bulb has intense output at approximately 405 nm and 420 nm and is ideally suited for exposure, although other lamp types can also be used. Light from the lamp is diffused by means of a piece of sandblasted sheet glass or "opal" glass placed between the lamp and the lens assembly.

The exposure intensity and time must be sufficient to initiate a rapid rate of polymerization and exotherm in order to achieve optical uniformity. The intensity of the "V" bulb light measured with a calibrated radiometer fitted with a narrow bandpass filter at 405 nm should be at least about 300 microwatts/cm$^2$, preferably at least 500 microwatts/cm$^2$. Higher intensity is even more desirable to obtain better optical and tint uniformity. Lower intensities will require somewhat longer exposure than higher intensities. A good practical value is approximately 4,000 microwatts/cm$^2$ for 15 to 20 minutes.

It is important to take precautions that the light is uniform over the lens surface. Intensity has an effect on base curvature of the completed lens, and variations in intensity will cause a non-uniformity of the curvature. Likewise, intensity can effect tint rate and non-uniformity of exposure could cause tint blotchiness.

After curing, the assembly is allowed to cool to an appropriate temperature for ease of disassembly. Lenses produced from the disclosed composition and cured as described have the following properties:

Index of refraction . . . 1.560
Color . . . white
U.V. cutoff
(5% transmission at 1.5 mm thickness) . . . >380 nm
Optical uniformity . . . very good
Tint speed . . . fast
Density (grams/cc) . . . 1.24
Impact strength (semifinished lens processed to 1.5 mm center thickness) . . . exceeds FDA requirements

EXAMPLES

Attempts were made to photopolymerize an unsaturated polyester composition containing an exotherm depressant, α-methyl styrene, according to the process of the U.S. parent application Ser. No. 08/315,598 filed Sep. 30, 1994, and incorporating 2-hydroxy-2-methyl-1-phenyl-propan-1-one (Ciba-Geigy Darocur 1173), a common, general purpose photoinitiator, illuminated by a Fusion Systems F-200 curing system equipped with a Fusion Type "D" electrodeless bulb. Approximately half of the bulb's output falls into the spectrum ranging from 350 to 450 nm, the remainder of the output falling into the ranges of 200 to 350 nm (approximately 25%), and 450 to 850 nm (approximately 20%). The photoinitiator has activity from approximately 200 to 370 nm. The formulation was comprised of a mixture of unsaturated polyester resin, Silmar D-910, (78 weight percent), diallyl phthalate (8 weight percent), alpha-methyl styrene (6 weight percent), methyl methacrylate (5 weight percent), and ethylene glycol dimethacrylate (3 weight percent). Silmar D-910 is an ortho-type unsaturated polyester resin combined with approximately 30 weight percent styrene.

The formulation described was mixed with varying amounts of Darocur 1173, and the resulting compositions were poured into mold assemblies, each consisting of two glass mold halves each having a curvature of approximately 6 diopters separated by a gasket to a distance of approximately 14 mm. The resulting casting from this arrangement has a convex curvature of approximately 6 diopters and a concave curvature also of approximately 6 diopters with a uniform thickness of approximately 13 mm. After the assemblies were filled with the liquid formulation, they were placed horizontally under the lamp to a distance of 18 inches. A sheet of 3/16 inch tempered glass, which was previously sand-blasted on one surface, served as a light diffusing element and was placed into position approximately 4 inches above the mold assemblies.

One group of assemblies was exposed to the lamp for a total of 15 minutes, another group for 30 minutes. In each case, the assemblies were inverted after half of the total exposure time to allow for exposure from the opposite side of the assembly. Thus in the case of the 30 minute exposure, the formulation was exposed through the rear mold for 15 minutes, the assembly was then inverted, and exposed through the front mold for an additional 15 minutes. Each group of assemblies contained the polyester liquid formulation with 0.10, 0.20, and 0.30 parts per hundred formulation (phf) Darocur 1173.

At the conclusion of the exposure period, the molds and gaskets were separated from the polymerized lens. The lenses were then evaluated for the degree of optical uniformity by visual examination, degree of hardness on the front and rear surfaces by a Barber Colman type 935 machine, and yellowness index (ASTM D-1925) using a Hunter Associates Laboratory UltraScan Model 30 color measurement system. The results are shown in Table 1 (Examples 1–6).

TABLE 1

| Example | Total Exposure (min) | Darocur 1173 (phf) | Optical Uniformity | Yellowness Index | Barcol Hardness (Average) |
|---|---|---|---|---|---|
| 1 | 15 | 0.10 | Very Poor | 4.2 | 0 |
| 2 | 15 | 0.20 | Very Poor | 2.4 | 62 |
| 3 | 15 | 0.30 | Very Poor | 2.5 | 88 |
| 4 | 30 | 0.10 | Poor | 7.0 | 89 |
| 5 | 30 | 0.20 | Poor | 17.1 | 89 |
| 6 | 30 | 0.30 | Poor | 27.1 | 89 |

Exposure time and photoinitiator concentration clearly affect hardness. The 15 minute exposure was insufficient to obtain good hardness at lower photoinitiator concentrations, while the 30 minute exposure time resulted in sufficiently hard lenses over the entire range. However, at longer exposure times, the lenses became significantly more yellow, especially at higher photoinitiator levels. Optical uniformity was unacceptable in all cases with heavy distortion being observed.

One possibility for the somewhat greater distortion observed for the groups exposed for 15 minutes was the disturbance of the gelling material during inversion of the assemblies. To test this possibility, lenses were exposed for a full 30 minutes without inversion. Hardness was measured on both surfaces to check for the degree of through-cure. The results are shown in Table 2 (Examples 7–9). Improvement in optical uniformity was noted, particularly in lenses made from higher levels of photoinitiator. However, at these higher levels, the degree of yellowness continued to present a substantial problem.

TABLE 2

| Example | Darocur 1173 (phf) | Optical Uniformity | Yellowness Index | Rear Barcol Hardness | Front Barcol Hardness |
|---|---|---|---|---|---|
| 7 | 0.10 | Poor | 6.5 | 89 | 89 |
| 8 | 0.20 | Fair | 11.4 | 90 | 89 |
| 9 | 0.30 | Fair | 21.6 | 90 | 89 |

Experiments were then conducted to improve the level of optical uniformity by varying the amount of alpha-methyl styrene in the mixture. Experience with thermal curing of unsaturated polyester lens compositions has shown that the addition of an exotherm depressing compound, such as alpha-methyl styrene, substantially improves optical uniformity. During the early stages of the thermally initiated polymerization process, prior to gelation, it is important to maintain a low temperature differential between the polymerizing composition and the surrounding curing medium. Heat generated during polymerization can give rise to convection currents, non-uniform polymerization, and striations in the lens if the temperature differential is substantial. It has been found that during the thermal curing process, the introduction of an exotherm depressant results in a sufficiently reduced rate of reaction, allowing for a lower temperature differential condition to exist, and a noticeable reduction in "waves" or striations in the lens.

Unexpectedly, however, with thephotoinitiated composition, the absence of alpha-methyl styrene did not result in degradation of optical properties. Compositions similar to that used in Examples 1–9 where styrene was simply substituted for alpha-methyl styrene and cured under the same conditions is shown in Table 3 (Examples 10–12). Thus, the composition consisted of 78% unsaturated polyester resin (Silmar D-910), 8% diallyl phthalate, 6% styrene, 5% methyl methacrylate, and 3% ethylene glycol dimethacrylate, and was initiated with 0.10, 0.20, and 0.30 parts per hundred formulation of Ciba-Geigy Darocur 1173. The lenses were cured for 30 minutes without inversion under the Fusion Type "D" apparatus as previously described. As shown in comparison to results in Table 2, optical uniformity actually improved at the 0.10 phf level, but remained essentially at a "Fair" rating at higher concentrations of Darocur 1173. Color, however, remained a substantial problem, getting worse with higher concentrations of photoinitiator.

TABLE 3

| Example | Darocur 1173 (phf) | Optical Uniformity | Yellowness Index | Rear Barcol Hardness | Front Barcol Hardness |
|---|---|---|---|---|---|
| 10 | 0.10 | Fair | 11.4 | 89 | 89 |
| 11 | 0.20 | Fair | 18.0 | 90 | 88 |
| 12 | 0.30 | Fair | 29.3 | 89 | 89 |

Other photoinitiators were tried at various levels in an attempt to improve color while maintaining hardness and generating acceptable optical uniformity. The same formulation used in Examples 10–12, that is, 78% unsaturated polyester resin (Silmar D-910), 8% diallyl phthalate, 6% styrene, 5% methyl methacrylate, and 3% ethylene glycol dimethacrylate was initiated with various levels of Ciba-Geigy Irgacure 184 (1-hydroxycyclohexyl phenyl ketone), Ciba-Geigy Irgacure 651 (2,2-dimethoxy-2-phenyl acetophenone), Ciba-Geigy Darocur 4265 (a mixture of 50% 2,4,6-trimethylbenzoyl-diphenylphosphine oxide and 50% 2-hydroxy-2-methyl-1-phenyl-propan-1-one), Ciba-Geigy Irgacure 1700 (a mixture of 25% bis(2,6-dimethoxybenzoyl)-2,4-,4trimethylpentyl phosphine oxide and 75% 2-hydroxy-2-methyl-1-phenyl-propan-1-one), and Ciba-Geigy Irgacure 1850 (a mixture of50% bis(2,6-dimethoxybenzoyl)-2,4-,4-trimethylpentylphosphine oxide and 50% 1-hydroxycyclohexyl phenyl ketone). The results are shown in Table 4 (Examples 13–26). While some compositions produced lenses which exhibited acceptable optical uniformity, the combination of full hardness, good color, and optical uniformity was not achieved. Example 19 produced lenses with good color, but low hardness. The remaining lenses were undesirably yellow (yellowness index of approximately 10 or greater), although they were hard, and many displayed acceptable optical uniformity.

TABLE 4

| Example | Photoinitiator (Conc.) | Optical Uniformity | Yellowness Index | Rear Barcol Hardness | Front Barcol Hardness |
|---|---|---|---|---|---|
| 13 | Irgacure 184 (0.05 phf) | Fair | 10.0 | 88 | 88 |
| 14 | Irgacure 184 (0.10 phf) | Fair | 17.4 | 89 | 89 |
| 15 | Irgacure 184 (0.20 phf) | Excellent | 25.6 | 89 | 89 |
| 16 | Irgacure 651 (0.05 phf) | Excellent | 18.8 | 88 | 88 |
| 17 | Irgacure 651 (0.10 phf) | Excellent | 30.8 | 89 | 89 |
| 18 | Irgacure 651 (0.20 phf) | Excellent | 33.6 | 89 | 89 |
| 19 | Darocur 4265 (0.05 phf) | Fair | 2.4 | 87 | 69 |
| 20 | Darocur 4265 (0.10 phf) | Good | 15.5 | 89 | 89 |
| 21 | Darocur 4265 (0.20 phf) | Excellent | 25.0 | 89 | 89 |
| 22 | Irgacure 1700 (0.05 phf) | Excellent | 12.2 | 89 | 88 |
| 23 | Irgacure 1700 (0.10 phf) | Good | 19.7 | 89 | 89 |
| 24 | Irgacure 1700 (0.20 phf) | Excellent | 28.9 | 89 | 89 |
| 25 | Irgacure 1850 (0.05 phf) | Fair | 9.7 | 89 | 88 |
| 26 | Irgacure 1850 (0.10 phf) | Fair | 14.7 | 89 | 88 |

UV absorbers are sometimes added to polymers to improve weathering characteristics, specifically to reduce color and other physical property degradation by sunlight. For ophthalmic lenses, UV absorbers are also sometimes added to reduce UV transmission through the lens and improve eye protection from sunlight UV. However, experiments with adding small quantities of UV absorber to the formulation had the unexpected result of also greatly improving the cured product color. In general, the UV absorber itself usually adds a degree of yellowness to the cured lens, the extent of which is dependent on the amount of absorber added. In cases where the amount of absorber added is quite high, the color may need to be "masked" with pigments or dyes. If the amount of dye added is of sufficient quantity to mask a lens with a high degree of yellowness, the resulting lens will have a "dark" appearance which is undesirable. Therefore, UV absorber concentration is normally minimized because of the coloration imparted to the lens. Table 5 (Examples 27–40) shows the effect of different levels of a typical UV absorber, 2-[2-hydroxy-3,5-di-(1,1-dimethylbenzyl) phenyl]-2H-benzotriazole (Ciba Geigy Tinuvin 234), included in the previously described base formulation on cast lens yellowness. While the addition of a small amount (0.005 phf) of Tinuvin 234 improved the cast color of formulations using Irgacure 651 as the photoinitiator, the addition of higher quantities of Tinuvin 234 interfered with the curing process by substantially blocking light energy of the wavelengths needed for Irgacure 651 to react. Table 9 shows spectral absorbance numbers measured for various photoinitiators at wavelengths from 200 to 450 nm. Photoinitiators with activity at higher wavelengths (demonstrated by absorbance above about 390 nm), that is, in these examples, Darocur 4265 and Irgacure 1850, produced satisfactory curing at even higher levels of Tinuvin 234.

The substitution of a Fusion Type "V" bulb with approximately 60% of its output falling onto the spectral range of 350 to 450 nm, with greatest intensity at approximately 405 nm and 420 nm also produced color improvement as is shown in Table 6 (Examples 41–48) for the case of a formulation initiated with Irgacure 1850. Examples 41 through 45 in Table 6 can be compared directly with Examples 31 through 35 in Table 5 to demonstrate the effectiveness of curing with the type "V" bulb. Examples 46 through 48 demonstrate that a good cure depth as evidenced by high hardness on both surfaces can be obtained at even higher concentrations of the UV absorber.

TABLE 5

Fusion Type "D" Lamp Illumination

| Example | Photoinitiator (0.10 phf) | Tinuvin 234 Conc. (phf) | Yellowness Index | Rear Barcol Hardness | Front Barcol Hardness |
|---|---|---|---|---|---|
| 27 | Irgacure 651 | 0 | 27.7 | 89 | 88 |
| 28 | Igracure 651 | 0.005 | 16.0 | 89 | 88 |
| 29 | Irgacure 651 | 0.010 | 11.6 | Very Soft | Very Soft |
| 30 | Irgacure 651 | 0.020 | 8.2 | Very Soft | Very Soft |
| 31 | Irgacure 1850 | 0 | 14.7 | 89 | 88 |
| 32 | Irgacure 1850 | 0.020 | 4.2 | 89 | 88 |
| 33 | Irgacure 1850 | 0.040 | 3.4 | 89 | 87 |
| 34 | Igracure 1850 | 0.080 | 3.3 | 89 | 87 |
| 35 | Irgacure 1850 | 0.160 | 3.8 | 88 | 87 |
| 36 | Darocur 4265 | 0 | 15.8 | 89 | 88 |
| 37 | Darocur 4265 | 0.020 | 3.3 | 89 | 87 |
| 38 | Darocur 4265 | 0.040 | 3.1 | 89 | 86 |
| 39 | Darocur 4265 | 0.080 | 3.0 | 88 | 86 |
| 40 | Darocur 4265 | 0.160 | 3.7 | 88 | 87 |

TABLE 6

Fusion Type "V" Lamp Illumination

| Example | Photoinitiator (0.10 phf) | Tinuvin 234 Conc. (phf) | Yellowness Index | Rear Barcol Hardness | Front Barcol Hardness |
|---|---|---|---|---|---|
| 41 | Irgacure 1850 | 0 | 9.1 | 89 | 89 |
| 42 | Irgacure 1850 | 0.020 | 3.0 | 89 | 87 |
| 43 | Irgacure 1850 | 0.040 | 2.6 | 89 | 88 |
| 44 | Irgacure 1850 | 0.080 | 2.8 | 89 | 87 |
| 45 | Irgacure 1850 | 0.160 | 3.6 | 89 | 88 |
| 46 | Irgacure 1850 | 0.240 | 4.3 | 89 | 88 |
| 47 | Irgacure 1850 | 0.320 | 5.1 | 89 | 88 |
| 48 | Irgacure 1850 | 0.400 | 5.4 | 88 | 87 |

As mentioned previously, incorporation of UV absorbers is desirable in ophthalmic lenses to provide a degree of protection for the eye from sunlight ultraviolet radiation. Additionally, UV absorbers provide plastic materials additional protection against weathering discoloration and other physical degradation from sunlight exposure. Table 7 (Examples 49–56) shows the effect of various levels of Ciba-Geigy Tinuvin 234 on weathering color change for the formulation initiated with 0.10 phf of Ciba-Geigy Irgacure 1850. For the test, semifinished lenses were prepared as previously described and cured under the same conditions as Examples 41–48 (that is with the type "V" bulb). The lenses were then processed to approximately 2 mm thickness with the front and rear curvatures being approximately 6 diopters. The processed lenses were then measured for ASTM D-1925 yellowness index using the UltraScan Model 30. One lens from each group was then exposed to direct outdoor sunlight for a period of one week (facing South at approximately a 45 degree angle), and then remeasured for the yellow index value. The difference from the pre-exposed value was then calculated as the "Yellowness Index Increase" shown in the table.

As shown by the data in Table 6, the optimum concentration of UV absorber to achieve the best (least) initial yellowness is about 0.04% by weight of the formulation. However, as shown in Table 7, a useful concentration of UV absorber in order to minimize further yellowing due to exposure to sunlight is about 0.4% by weight of the formulation. The concentration of UV absorber, therefore, preferably is in the range of about 0.04–0.40% by weight of the formulation, with least yellowing (initially and as a result of sunlight discoloration) occurring at a UV absorber concentration of about 0.15 to about 0.30 percent by weight of the formulation.

A point of diminishing effect occurs at approximately 0.24 phf of Tinuvin 234. Higher concentrations of absorber only increase initial yellowness without additional significant weathering protection. Consequently a concentration of approximately 0.25 phf was established for the development of future formulations using Tinuvin 234.

TABLE 7

SUNLIGHT WEATHERING COLOR CHANGE (1 WEEK)

| Example | Tinuvin 234 (phf) | Yellowness Index Increase |
|---|---|---|
| 49 | 0 | 9.30 |
| 50 | 0.02 | 4.26 |
| 51 | 0.04 | 3.41 |
| 52 | 0.08 | 1.69 |
| 53 | 0.16 | 0.49 |

TABLE 7-continued

SUNLIGHT WEATHERING COLOR CHANGE (1 WEEK)

| Example | Tinuvin 234 (phf) | Yellowness Index Increase |
|---|---|---|
| 54 | 0.24 | 0.30 |
| 55 | 0.32 | 0.27 |
| 56 | 0.40 | 0.26 |

As disclosed in the parent patent application (U.S. Ser. No. 08/315,598), the addition of allylic monomers, acrylate monomers, and combinations of allyl and acrylate monomers can improve unsaturated polyester lens performance with regard to increased tint speed and improved abrasion resistance. Table 8 (Examples 57–68) shows various compositions and corresponding lens properties. All of the formulations consisted of mixtures of Silmar D-910 unsaturated polyester resin with a given additive, the composition of which is detailed in Table 8. In Examples 57–68 the D-910 resin was mixed with from 10% to 50% additive as a weight percentage of the total composition. The photoinitiator was added to each of the compositions along with the UV absorber, Tinuvin 234, which was at a concentration of 0.25 parts per hundred of the resin-additive formulation. The resulting formulations were filtered through a 0.2 micron nominal filter, and then used to fill mold assemblies. Fifteen lenses were cast using each formulation from assemblies constructed from glass molds, separated by a gasket made from a material chemically compatible with the formulation, such that the resulting lenses each had an approximate diameter of 75 mm. Of the fifteen lenses in each example, five had a front curvature of approximately 4 diopters and a rear curvature of approximately 6 diopters with an edge thickness of approximately 15 mm; five had a front curvature of approximately 6 diopters and a rear curvature of approximately 6 diopters with an edge thickness of approximately 13 mm; the remaining five had a front curvature of approximately 8 diopters and a rear curvature of approximately 6 diopters with an edge thickness of approximately 10 mm.

The mold assemblies, having been filled with the formulation, were then illuminated with the light produced from a Fusion Type "V" bulb. A piece of tempered sheet glass, three-sixteenths of an inch thick and sandblasted on one surface to act as a light diffuser, was placed approximately four and one-half inches from the assembles, between the assemblies and the lamp. The measured light intensity at the assembly was approximately 4 milliwatts per square centimeter as measured by an International Light model IL1400A radiometer equipped with a detector and narrow bandwidth filter for 405 nm measurement. The assemblies were exposed for half of their total cure time with the light first passing through the rear mold, then for the remainder of the total cure time with the light first passing through the front mold. At the conclusion of the exposure, the lenses were separated from the mold assemblies and tested.

Lenses from each formulation were rated as to the degree of optical distortion by a lens inspector, and the ratings were averaged. "Excellent" and "Good" ratings indicate the lenses had no or extremely light optical distortions, visible only to a trained lens inspector under special lighting conditions. The "Fair" rating indicates a borderline acceptance level, while "Poor" or "Very Poor" ratings indicate a level of distortion which would normally not be market acceptable.

Barcol hardness was measured, as previously mentioned by a Barber Colman type 935 machine. A rating of 80 or more is deemed to be acceptable.

Yellowness Index, as previously mentioned, was measured on a Hunter UltraScan Model 30 using ASTM D-1925 criteria. As in the other examples, with the exception of Examples 49–56, the semifinished 6 diopter front and 6 diopter rear curve, 13 mm thick lens was the configuration measured. The measurement was done in reflectance mode against a standard white tile.

A 6 diopter front and rear curve lens from each group was processed to approximately 2 mm thickness and tinted simultaneously in gray tinting solution (BPI Gray) for 5 minutes at approximately 200° F. Those lenses exhibiting a percent transmission of visible light after tinting of greater than or equal to 50% were rated "Very Slow"; 40–49%: "Slow"; 30–39%: "Medium"; 20–29%: "Fast"; less than 20% transmission were rated as "Very Fast".

Refractive Index was of the resulting polymer as measured on an Abbe refractometer.

Three 6 diopter lenses were processed from each group to piano configuration (approximately 6 diopter rear curvature and thickness of approximately 2.5 mm), and were measured for haze using a Gardner Model XL211 Hazegard (TM) System. The front surface of one lens from each group was then covered with protective tape and introduced into a hexagonal tumbling barrel with internal side dimensions of approximately 8 inches (wide)×6 inches. An abrasive mixture was also introduced into the barrel, and the barrel was rotated at approximately 30 rpm for a period of 2 hours. The abrasive mixture consisted of a mixture of scouring pad pieces, polyurethane foam, wheat bran, sawdust, grit-o-cob, and emery powder. At the conclusion of the 2 hour rotation, the tape was removed and the lenses were cleaned, again measured for haze, and the haze gain due to abrasion was calculated. The ratio between the haze gain of the unsaturated polyester resin/styrene composition of Example 57 and the haze gain of the other compositions of Examples 58–68 is listed as the "Abrasion Value" in Table 8.

Example 57 demonstrates a composition consisting of an unsaturated polyester resin and additional styrene, and forms a basis for comparison to other additive compositions. It has the least abrasion resistance, since the other examples measured (58–68) all have lower values. It is also relatively slow to tint.

Example 58 demonstrates how the addition of allylic esters can improve tint speed. High allyl levels, however, require relatively high levels of photoinitiator (0.80 phf) and a long exposure time (30 minutes), which results in a lens which is quite yellow.

In Example 59, the addition of more reactive acrylates results in a hard lens which requires relatively low levels of photoinitiator (0.08 phf) for cure. Abrasion resistance is also improved.

Example 60 illustrates the combination of allyl monomers (diallyl phthalate) and acrylate monomers (ethylene glycol dimethacrylate, methyl methacrylate, and dipentaerythritol pentaacrylate) to produce a lens which has excellent optical distortion characteristics and fast tint rate. Other allyl and acrylate materials can be substituted into this composition as is demonstrated in Examples 61–63 to still achieve the excellent optical distortion and fast tint rate characteristics.

Example 64 is a low viscosity formulation which could be useful for casting finished lenses where an index of refraction of approximately 1.56 is required. The slower tint speed, likely caused by the higher styrene content, would not present a practical problem, unlike the semifinished lens, since most finished lenses are coated with a scratch resistant tintable coating.

Examples 65–68 demonstrate the addition of various levels of the additives of Example 60 expressed as a percentage of the mixture with D-910 resin. At low levels (10%, as shown in Example 65), optical distortion is a problem, while higher levels can produce lenses with good to excellent optical distortion characteristics. However, for these compositions, as the percentage of additives increases, the index of refraction is decreased, and the lens becomes softer.

TABLE 8

| Example | Additive Composition | % Additive | Photoinitiator Conc. (phf) | Total Cure Time | Barcol Hardness | Optical Distortion Rating | Yellowness Index | Tint Speed Rating | Refractive Index | Abrasion Value |
|---|---|---|---|---|---|---|---|---|---|---|
| 57 | 100% Styrene | 13% | Irgacure 1850 (0.10 phf) | 20 min. | 89 | Fair | 6.5 | Slow | 1.572 | 1.00 |
| 58 | 75% DAP 25% TAC | 20% | Darocur 4265 (0.80 phf) | 30 min. | 85 | Fair | 13.3 | Very Fast | 1.565 | 0.77 |
| 59 | 80% EGDMA 20% DPPA | 25% | Irgacure 1850 (0.08 phf) | 15 min. | 89 | Good | 5.8 | Fast | 1.554 | 0.63 |
| 60 | 45.5% EGDMA 22.7% DAP 22.7% DPPA 9.1% MMA | 22% | Irgacure 1850 (0.10 phf) | 15 min. | 89 | Excellent | 6.2 | Fast | 1.558 | 0.73 |
| 61 | 45.5% HDA 22.7% DAP 22.7% DPPA 9.1% MMA | 22% | Irgacure 1850 (0.10 phf) | 15 min. | 88 | Excellent | 5.5 | Fast | 1.558 | 0.61 |
| 62 | 45.5% EGDMA 22.7% TAC 22.7% DPPA 9.1% MMA | 22% | Irgacure 1850 (0.10 phf) | 15 min. | 89 | Exce;;ent | 6.2 | Fast | 1.558 | 0.70 |
| 63 | 45.5% EGDMA 22.7% ADC 22.7% DPPA 9.1% MMA | 22% | Irgacure 1850 (0.10 phf) | 15 min. | 88 | Excellent | 6.1 | Fast | 1.557 | 0.60 |
| 64 | 48.6% EGDMA 22.9% DAP 17.1% Styrene 11.4% MMA | 35% | Irgacure 1850 (0.20 phf) | 15 min. | 89 | Fair | 7.4 | Slow | 1.559 | 0.55 |
| 65 | 45.5% EGDMA 22.7% DAP 22.7% DPPN 9.1% MMA | 10% | Irgacure 1850 (0.10 phf) | 15 min. | 89 | Poor | 5.8 | Fast | 1.563 | 0.73 |
| 66 | 45.5% EGDMA 22.7% DAP 22.7% DPPA 9.1% MMA | 30% | Irgacure 1850 (0.10 phf) | 15 min. | 88 | Excellent | 6.5 | Fast | 1.556 | 0.47 |
| 67 | 45.5% EGDMA 22.7% DAP 22.7% DPPA 9.1% MMA | 40% | Irgacure 1850 (0.10 phf) | 15 min. | 87 | Excellent | 6.6 | Very Fast | 1.552 | 0.51 |
| 68 | 45.5% EGDMA 22.7% DAP 22.7% DPPA 9.1% MMA | 50% | Irgacure 1850 (0.12 phf) | 15 min. | 86 | Good | 7.4 | Very Fast | 1.547 | 0.45 |

Table Notes:
All formulations are based on Silmar D-910 unsaturated polyester resin. D-910 is a clear unsaturated polyester ortho resin intermediate formed from the reaction of phthalic anhydride, maleic anhydride, propylene glycol, ethylene glycol and diethylene glycol and has a number average molecular weight of about 2,200. It contains approximately 30% by weight styrene as a diluent monomer.
The "% Additive" is the weight percent additive in the composition consisting of the D-910 resin and the additive.
DAP is diallyl phthalate
TAC is triallyl cyanurate
MMA is methyl methacrylate
EGDMA is ethylene glycol dimethacrylate (SARTOMER SR206)
DPPA is dipentaerythritol pentaacrylate (SARTOMER SR399)
HDA is 1,6 hexanediol diacrylate (SARTOMER SR238)
ADC is diethylene glycol bis(allyl carbonate) -- (PPG CR-39)

TABLE 9

ABSORBANCE VALUES FOR PHOTOINITIATORS
(0.10 WT % IN ACETONITRILE - 1 CM PATH LENGTH)

| Wavelength (nm) | Darocur 1173 | Irgacure 184 | Irgacure 651 | Darocur 4265 | Irgacure 1700 | Irgacure 1850 |
|---|---|---|---|---|---|---|
| 200 | >3.50 | >3.50 | >3.50 | >3.50 | >3.50 | >3.50 |
| 210 | >3.50 | >3.50 | >3.50 | >3.50 | >3.50 | >3.50 |
| 220 | >3.50 | >3.50 | >3.50 | >3.50 | >3.50 | >3.50 |
| 230 | >3.50 | >3.50 | >3.50 | >3.50 | >3.50 | >3.50 |
| 240 | >3.50 | >3.50 | >3.50 | >3.50 | >3.50 | >3.50 |
| 250 | >3.50 | >3.50 | >3.50 | >3.50 | >3.50 | >3.50 |
| 260 | >3.50 | >3.50 | >3.50 | >3.50 | >3.50 | >3.50 |
| 270 | >3.50 | 3.26 | >3.50 | >3.50 | >3.50 | >3.50 |

TABLE 9-continued

ABSORBANCE VALUES FOR PHOTOINITIATORS
(0.10 WT % IN ACETONITRILE - 1 CM PATH LENGTH)

| Wavelength (nm) | Darocur 1173 | Irgacure 184 | Irgacure 651 | Darocur 4265 | Irgacure 1700 | Irgacure 1850 |
|---|---|---|---|---|---|---|
| 280 | >3.50 | 3.18 | >3.50 | >3.50 | >3.50 | >3.50 |
| 290 | 2.82 | 2.11 | 2.60 | >3.50 | >3.50 | >3.50 |
| 300 | 0.69 | 0.51 | 1.12 | >3.50 | >3.50 | >3.50 |
| 310 | 0.40 | 0.31 | 0.42 | 2.55 | 2.70 | 2.95 |
| 320 | 0.41 | 0.36 | 0.57 | 1.80 | 2.38 | 3.13 |
| 330 | 0.38 | 0.37 | 0.74 | 0.89 | 1.91 | 2.90 |
| 340 | 0.30 | 0.32 | 0.81 | 0.45 | 1.42 | 2.44 |
| 350 | 0.19 | 0.22 | 0.70 | 0.39 | 0.90 | 1.58 |
| 360 | 0.08 | 0.12 | 0.53 | 0.44 | 0.58 | 1.05 |
| 370 | 0.03 | 0.05 | 0.28 | 0.50 | 0.37 | 0.69 |
| 380 | 0.00 | 0.01 | 0.12 | 0.62 | 0.28 | 0.53 |
| 390 | 0.00 | 0.00 | 0.02 | 0.46 | 0.27 | 0.52 |
| 400 | 0.00 | 0.00 | 0.00 | 0.39 | 0.26 | 0.50 |
| 410 | 0.00 | 0.00 | 0.00 | 0.09 | 0.23 | 0.44 |
| 420 | 0.00 | 0.00 | 0.00 | 0.01 | 0.12 | 0.23 |
| 430 | 0.00 | 0.00 | 0.00 | 0.00 | 0.04 | 0.07 |
| 440 | 0.00 | 0.00 | 0.00 | 0.00 | 0.01 | 0.02 |
| 450 | 0.00 | 0.00 | 0.00 | 0.00 | 0.01 | 0.01 |

For each of the formulations used in Examples 57–68 and for the curing condition described (that is, light intensity from the Type "V" bulb of approximately 4 milliwatts per square centimeter measured at 405 nm), time for the formulation to gel, peak temperature obtained during cure and the time to reach peak temperature were recorded.

To determine the time required to gel, glass tubes measuring approximately 10.5 mm inside diameter and 114 mm in length were filled to a depth of approximately 110 mm with the formulation and stoppered, the gap between the fluid and stopper being filled by nitrogen. The tubes were exposed in an almost horizontal, but slightly inclined position to keep the nitrogen bubble at one end of the tube. The exposure time required to keep the nitrogen bubble from ascending when the tube was inverted to a vertical position, with the bubble initially at the bottom, was the recorded gel time.

To determine the peak temperature value for the formulation, a glass vial measuring approximately 24 mm inside diameter and 58 mm in length was filled with 23 grams of the formulation. The vial was sealed with a stopper, a thermocouple being positioned through the stopper such that the thermocouple junction was placed at the center of the mass of formulation, and the space between the fluid and stopper was filled with nitrogen. The thermocouple was connected to a temperature recorder, and the vial was placed in an almost horizontal position, but slightly inclined to keep the nitrogen bubble near the top of the vial. The time from the start of exposure to when the maximum temperature was achieved, was recorded as the time required for the formulation to reach peak temperature.

Table 10 lists the gel times, peak temperatures, and time to reach peak temperature for the various formulations as measured by the above-described test procedures. In practice, lens geometries can change over quite a wide range with regard to thickness and diameter of the curing formulation. Consequently, different quantities and distributions of the formulation will be encountered for various lens configurations. Therefore, gel times and internal temperatures will vary during actual lens curing conditions. By standardizing the tests as described, however, meaningful data relative to the curing condition of a given formulation can be established.

To determine how changes in peak temperature, time to reach peak temperature, and gel time can effect lens properties of hardness and optical distortion, tests were conducted on a formulation consisting of approximately 78 weight percent D-910 resin (including 30% by weight styrene diluent) and 22 weight percent of an additive. The composition of the additive consisted of approximately 50 weight percent ethylene glycol dimethacrylate, 22 weight percent diallyl phthalate, 17 weight percent dipentaerythritol pentaacrylate, and 11 weight percent methyl methacrylate. To the mixture of the D-910 resin and additive was added 0.25 parts per hundred UV absorber (Ciba-Geigy Tinuvin 234), and varying amounts of alpha-methyl styrene and photoinitiator (Ciba-Geigy Irgacure 1850). The formulations were cast into lens assemblies and cured under varying intensities of light from the Fusion Type "V" bulb system previously described for Examples 57–68. The exposure time was 90 minutes, and the exposure was made with the light passing through the rear mold first (no inversion). The gel time, peak temperature, and time to reach peak temperature for each formulation were measured as previously described.

Nine lenses were cast for each example, three having a front curvature of approximately 4 diopters, three with a front curvature of approximately 6 diopters, and three with a front curvature of approximately 8 diopters. All lenses had a rear curvature of approximately 6 diopters. Edge thicknesses were approximately 15 mm for the 4 diopter lens, 13 mm for the 6 diopter lens, and 10 mm for the 8 diopter lens. The lenses were evaluated for optical uniformity, and the 6 base lenses were evaluated for front and rear hardness. The results are shown in Table 11 (Examples 69–83).

Examples 69–73 illustrate that formulations subjected to conditions which result in relatively long gel times (greater than about 5 minutes) and low peak temperatures (less than about 230° F.) tend to be somewhat softer with worse optical uniformity than those which are subjected to conditions which produce rapid gelation (less than about 5 minutes, particularly less than about 1 minute) and high peak temperature (greater than about 300° F.) as illustrated by Examples 81–83. Intermediate conditions, illustrated by Examples 74–80, can produce a range of hardness and optical uniformity.

TABLE 10

| Example | Gel Time (seconds) | Peak Temperature (° F.) | Time to Peak Temperature (minutes) |
|---|---|---|---|
| 57 | 13 | 343 | 6.9 |
| 58 | 10 | 301 | 5.5 |
| 59 | 25 | 376 | 4.0 |
| 60 | 18 | 370 | 3.6 |
| 61 | 14 | 360 | 4.6 |
| 62 | 17 | 367 | 3.6 |
| 63 | 15 | 357 | 3.7 |
| 64 | 37 | 398 | 4.6 |
| 65 | 13 | 345 | 4.0 |
| 66 | 22 | 367 | 3.7 |
| 67 | 30 | 373 | 4.8 |
| 68 | 45 | 376 | 5.3 |

TABLE 11

| Example | Irgacure 1850 (wt. %) | Alpha-methyl styrene (wt. %) | Light Intensity (uw/cm² at 405nm) | Gel Time (minutes) | Peak Temperature (° F.) | Time to Peak (minutes) | Front Hardness (Barcol) | Rear Hardness (Barcol) | Optical Uniformity |
|---|---|---|---|---|---|---|---|---|---|
| 69 | 0.07 | 5.0  | 250  | 7.2 | 235 | 35.6 | 64 | 75 | Fair |
| 70 | 0.07 | 10.0 | 2100 | 6.8 | 225 | 52.4 | 81 | 85 | Fair |
| 71 | 0.05 | 8.0  | 1000 | 6.5 | 168 | 64.1 | 38 | 78 | Poor |
| 72 | 0.09 | 8.0  | 1000 | 4.7 | 222 | 44.2 | 80 | 88 | Fair |
| 73 | 0.05 | 8.0  | 3200 | 4.6 | 254 | 40.5 | 86 | 85 | Poor |
| 74 | 0.04 | 5.0  | 2100 | 3.6 | 228 | 40.7 | 84 | 87 | Fair |
| 75 | 0.09 | 8.0  | 3200 | 3.4 | 276 | 28.5 | 90 | 90 | Good |
| 76 | 0.05 | 2.0  | 1000 | 2.2 | 257 | 18.1 | 83 | 88 | Good |
| 77 | 0.07 | 5.0  | 2100 | 2.0 | 258 | 26.2 | 88 | 90 | Fair |
| 78 | 0.07 | 5.0  | 4000 | 1.8 | 319 | 19.7 | 90 | 91 | Poor |
| 79 | 0.09 | 2.0  | 1000 | 1.5 | 346 | 10.2 | 88 | 91 | Fair |
| 80 | 0.10 | 5.0  | 2100 | 1.6 | 294 | 18.3 | 89 | 90 | Good |
| 81 | 0.09 | 2.0  | 3200 | 0.8 | 323 | 9.5  | 90 | 91 | Good |
| 82 | 0.05 | 2.0  | 3200 | 0.7 | 305 | 16.5 | 90 | 91 | Excellent |
| 83 | 0.07 | 0.0  | 2100 | 0.6 | 349 | 5.6  | 89 | 91 | Good |

Suitable formulation and compositional ranges for semi-finished lenses are:

| Component | Weight % | Range % | Preferred |
|---|---|---|---|
| Unsaturated polyester resin (Silmar D-910) containing 30% styrene diluent | 77.75 (w/diluent) 54.42 (w/o diluent) | 40–95 (w/diluent) 25–70 (w/o diluent) | 50–85 (w/diluent) 35–60 (w/o diluent) |
| Ethylene glycol dimethacrylate | 11.00 | 0–25 | 4–20 |
| Diallyl phthalate | 4.84 | 0–15 | 2–10 |
| Dipentaerythritol pentaacrylate | 3.67 | 0–15 | 2–12 |
| Methyl methacrylate | 2.37 | 0–10 | 1–6 |
| Tinuvin 234 | 0.27 | 0–1 | 0.01–0.8 |
| Irgacure 1850 | 0.10 | 0–1 | 0.01–1 |
| Blue dye | trace | trace | trace |
| Red dye | trace | trace | trace |
| Alpha-methyl styrene* | 0 | 0–10 | 0 |

*Exotherm depressant. Other suitable exotherm depressants include terpinolene; gamma-terpinene; dilauryl thiopropionate; 4-tert-butylpyrocatechol; 3-methyl catechol; and mixtures thereof.

Suitable formulation and compositional ranges for finished cast lenses are:

| Component | Weight % | Range % | Preferred |
|---|---|---|---|
| Unsaturated polyester resin (Silmar D-910) containing 30% styrene diluent | 65.00 (w/diluent) 45.50 (w/o diluent) | 45–75 (w/diluent) 31–53 (w/o diluent) | 50–70 (w/diluent) 35–50 (w/o diluent) |
| Ethylene glycol dimethacrylate* | 17.36 | 0–30 | 10–25 |
| Diallyl phthalate | 7.64 | 0–15 | 2–10 |
| Styrene | 5.79 | 0–20 | 2–15 |
| Methyl methacrylate | 3.74 | 0–10 | 1–6 |
| Tinuvin 234 | 0.27 | 0–1 | 0.01–0.8 |
| Irgacure 1850 | 0.20 | 0–1 | 0.01–1 |
| Blue dye | trace | trace | trace |
| Red dye | trace | trace | trace |
| Alpha-methyl styrene** | 0 | 0–10 | 0 |

*For improved flexibility and impact resistance, polyethylene (di, tri, tetra, etc.) glycol diacrylates and dimethacrylates can be directly substituted for ethylene glycol dimethacrylate.
**Exotherm depressant. Other suitable exotherm depressants include terpinolene; gamma-terpinene; dilauryl thiopropionate; 4-tert-butylpyrocatechol; 3-methyl catechol; and mixtures thereof.

What is claimed is:

1. A cross-linkable casting composition comprising:
   about 25% to about 70% by weight of an unsaturated polyester resin;
   a cross-linking agent for the unsaturated polyester resin in an amount of about 5% to about 75% by weight; and
   an effective amount of a photoinitiator, capable of gelling the polyester in about 7 minutes or less and capable of curing the unsaturated polyester in about 3 hours or less when the combination of said unsaturated polyester and the photoinitiator are exposed to a light intensity sufficient to gel the polyester resin in about 7 minutes or less, wherein the composition is cast and cured into an ophthalmic lens having an index of refraction of at least 1.50.

2. The ophthalmic lens of claim 1, wherein the photoinitiator is selected from the group consisting of α-hydroxy ketones, phosphinates, phosphine oxides, and mixtures thereof.

3. The ophthalmic lens of claim 1, wherein the photoinitiator has activity above about 380 nm.

4. An ophthalmic lens in accordance with claim 1, wherein the photoinitiator is selected from the group consisting of 2,4,6-trimethylbenzoyl-diphenylphosphine oxide; ethyl 2,4,6-trimethylbenzoylphenylphosphinate; bis(2,6-dimethoxybenzoyl)-2-4,4-trimethylpentyl phosphine oxide; bis(2,4,6 trimethylbenzoyl) phenyl phosphine oxide; 1-hydroxycyclohexyl phenyl ketone; 2-hydroxy-2-methyl-1-phenyl-propan-1-one; and mixtures thereof.

5. An ophthalmic lens in accordance with claim 4, wherein the photoinitiator is a mixture of 10–90% by weight bis(2,6-dimethoxybenzoyl)-2-4-,4-trimethylpentyl phosphine oxide; and 10–90% by weight of a ketone selected from the group consisting of 1-hydroxycyclohexyl phenyl ketone, 2-hydroxy-2-methyl-1-phenyl-propan-1-one, and mixtures thereof, based on the total weight of photoinitiators in the composition.

6. An ophthalmic lens in accordance with claim 1, wherein the composition further includes an ultraviolet light-absorbing compound capable of absorbing light having a wavelength of about 380 nm or below.

7. An ophthalmic lens in accordance with claim 6, wherein the ultraviolet light-absorbing compound is included in an amount of about 0.04% to about 0.4% by weight of the composition.

8. An ophthalmic lens in accordance with claim 7, wherein the ultraviolet light-absorbing compound is included in an amount of about 0.15% to about 0.3% by weight of the composition.

9. An ophthalmic lens in accordance with claim 1, wherein the cross-linking agent comprises an allylic ester selected from the group consisting of diallyl phthalate, diethylene glycol bis(allyl carbonate), triallyl cyanurate, diallyl diphenate and mixtures thereof.

10. An ophthalmic lens in accordance with claim 9, wherein the photoinitiator comprises about 0.01% to about 2% by weight of the composition.

11. An ophthalmic lens in accordance with claim 1, wherein the cross-linking agent comprises an acrylate selected from the group consisting of an acrylate monomer, an acrylate oligomer having a weight average molecular weight below about 1,000, and mixtures thereof.

12. An ophthalmic lens in accordance with claim 11, wherein the photoinitiator comprises about 0.01% to about 2% by weight of the total composition.

13. An ophthalmic lens in accordance with claim 1, wherein the photoinitiator comprises about 0.01% to about 2% by weight of the total composition.

14. An ophthalmic lens in accordance with claim 1, wherein the composition includes 0.01% to 10% of an exotherm depressant.

15. The ophthalmic lens of claim 14, wherein the exotherm depressant is selected from the group consisting of alpha-methyl styrene; terpinolene; gamma-terpinene; dilauryl thiopropionate; 4-tert-butylpyrocatechol; 3-methylcatechol; and mixtures thereof.

16. The ophthalmic lens of claim 1, wherein the cross-linking agent is selected from the group consisting of styrene; an allylic ester monomer; an acrylate monomer; an acrylate oligomer; and mixtures thereof.

17. An ophthalmic lens in accordance with claim 16, wherein the cross-linking agent comprises both an allylic ester monomer and an acrylate in a total amount of allylic ester and acrylate of about 1% to about 50% by weight.

18. An ophthalmic lens in accordance with claim 17, wherein the allylic ester monomer is present in an amount of about 1% to about 15% by weight, and the acrylate is present in the composition in an amount of about 1% to about 35% based on the total weight of the composition.

19. An ophthalmic lens in accordance with claim 18, wherein the acrylate is selected from the group consisting of a mono-, di-, tri-, tetra-, and penta-acrylate or methacrylate, and mixtures thereof.

20. An ophthalmic lens in accordance with claim 19, wherein the acrylate is selected from the group consisting of methyl methacrylate; ethyl acrylate; cyclohexyl methacrylate; 2-hydroxyethyl methacrylate; 3-hydroxypropyl acrylate; alpha-bromoethyl acrylate; alpha-chloroethyl acrylate; chloromethyl methacrylate; 2-bromethyl methacrylate; 2-naphthyl methacrylate; para-tolyl acrylate; para-chlorophenyl methacrylate; meta-bromophenyl acrylate; 2,4,6-tribromophenyl acrylate; para-chlorobenzyl methacrylate; meta-methoxybenzyl methacrylate; para-ethylbenzyl acrylate; 1,6 hexanediol dimethacrylate; neopentyl glycol diacrylate; a thiodiethylene glycol dimethacrylate; ethoxylated bisphenol A diacrylate; ethoxylated bisphenol A dimethacrylate; pentaerythritol triacrylate; glyceryl triacrylate; dipentaerythritol pentaacrylate; trimethylolpropane triacrylate; tris (2-hydroxy ethyl) isocyanurate trimethacrylate; trimethylolpropane polyoxyethylene triacrylate; a urethane acrylate; a urethane methacrylate; bis(4-methacryloylthiophenyl) sulfide; an ethylene glycol or a polyethylene glycol selected from the group consisting of acrylate, methacrylate, diacrylate, dimethacrylate, and mixtures thereof.

21. An ophthalmic lens in accordance with claim 20, wherein the acrylate is a monomer selected from the group consisting of methyl methacrylate; an ethylene glycol or a polyethylene glycol selected from the group consisting of acrylate, methacrylate, diacrylate, dimethacrylate, and mixtures thereof; 1,6 hexanediol diacrylate; ethoxylated bisphenol A diacrylate; ethoxylated bisphenol A dimethacrylate; trimethylolpropane polyoxyethylene triacrylate; dipentaerythritol pentaacrylate; bis(4-methacryoylthiophenyl) sulfide; and mixtures thereof.

22. An ophthalmic lens in accordance with claim 16, wherein the cross-linking agent comprises about 1% to about 45% by weight styrene; about 1% to about 15% by weight of an allylic ester monomer; and about 1% to about 35% by weight of an acrylate selected from the group consisting of an acrylate monomer, an acrylate oligomer, and mixtures thereof.

23. An ophthalmic lens in accordance with claim 1, wherein the unsaturated polyester resin is formed by the reaction of an acid or anhydride selected from the group consisting of phthalic acid, isophthalic acid, maleic acid, phthalic anhydride, maleic anhydride, and mixtures thereof, with a polyol selected from the group consisting of ethylene glycol, propylene glycol, diethylene glycol, dipropylene glycol, neopentyl glycol, and mixtures thereof.

24. An ophthalmic lens in accordance with claim 23, wherein the unsaturated polyester has a number average molecular weight in the range of about 1,500 to about 4,000.

25. An ophthalmic lens having an index of refraction of at least 1.50 cast from a composition comprising:
about 40% to about 95% by weight of the composition being a mixture of an unsaturated polyester resin and a diluent monomer cross-linking agent for said polyester resin;
an allylic ester monomer in an amount of about 1% to about 15% by weight;
about 1% to about 35% by weight of an acrylate selected from the group consisting of an acrylate monomer, an acrylate oligomer, and mixtures thereof; and
an effective amount of a photoinitiator, capable of gelling the unsaturated polyester in about 7 minutes or less and capable of curing the unsaturated polyester in about 3 hours or less when the combination of said unsaturated polyester and the photoinitiator are exposed to a light intensity sufficient to gel the unsaturated polyester resin in about 7 minutes or less.

26. The ophthalmic lens in accordance with claim 25, wherein the diluent monomer cross-linking agent comprises about 10% to about 45% by weight of the mixture of unsaturated polyester resin and diluent monomer cross-linking agent.

27. The ophthalmic lens in accordance with claim 26, wherein the allylic ester monomer comprises about 2% to about 10% diallyl phthalate, based on the total weight of the composition; wherein the acrylate is an ethylene glycol or a polyethylene glycol selected from the group consisting of an acrylate, a methacrylate, a diacrylate, a dimethacrylate, and mixtures thereof, including about 1% to about 6% methyl methacrylate, based on the total weight of the composition; and wherein the polymerization initiator is included in the composition in an amount of about 0.01% to about 2% based on the total weight of the composition.

28. An ophthalmic lens in accordance with claim 26, further including 0.01% to about 10% by weight of the composition of alpha-methyl styrene, and wherein the diluent monomer cross-linking agent comprises styrene.

29. A method of casting a cross-linkable casting composition into an ophthalmic lens comprising disposing the casting composition in a mold cavity and contacting the composition with a light source having an intensity sufficient to gel the composition in about 7 minutes or less, to photocure, polymerize and cross-link the composition, wherein the composition comprises:
about 25% to about 70% by weight of an unsaturated polyester resin;
a cross-linking agent for the unsaturated polyester resin in an amount of about 5% to about 75% by weight; and
an effective amount of a photoinitiator, capable of gelling the polyester in about 7 minutes or less and capable of curing the unsaturated polyester in about 3 hours or less when the combination of said unsaturated polyester and the photoinitiator are exposed to a light intensity sufficient to gel the polyester resin in about 7 minutes or less.

30. The method of claim 29, wherein the photoinitiator is selected from the group consisting of α-hydroxy ketones, phosphinates, phosphine oxides, and mixtures thereof.

31. The method of claim 30, wherein the photoinitiator has activity above about 380 nm.

32. A method in accordance with claim 29, wherein the photoinitiator is selected from the group consisting of 2,4,6-trimethylbenzoyl-diphenylphosphine oxide; ethyl 2,4,6-trimethylbenzoylphenylphosphinate; bis(2,6-dimethoxybenzoyl)-2-4-,4-trimethylpentyl phosphine oxide; bis(2,4,6 trimethylbenzoyl) phenyl phosphine oxide; 1-hydroxycyclohexyl phenyl ketone; 2-hydroxy-2-methyl-1-phenyl-propan-1-one; and mixtures thereof.

33. A method in accordance with claim 32, wherein the photoinitiator is a mixture of 10–90% by weight bis(2,6-dimethoxybenzoyl)-2-4-,4-trimethylpentyl phosphine oxide; and 10–90% by weight of a ketone selected from the group consisting of 1-hydroxycyclohexyl phenyl ketone, 2-hydroxy-2-methyl-1-phenyl-propan-1-one, and mixtures thereof, based on the total weight of photoinitiators in the composition.

34. A method in accordance with claim 29, wherein the light source has an intensity of at least about 300 microwatts/cm$^2$.

35. A method in accordance with claim 30, wherein the light source has an intensity in the range of about 500 microwatts/cm$^2$ to about 10,000 microwatts/cm$^2$.

36. A method in accordance with claim 35, wherein the light source has an intensity in the range of about 1,500–7,000 microwatts/cm$^2$.

37. A method in accordance with claim 29, wherein the composition further includes an ultraviolet light-absorbing compound capable of absorbing light having a wavelength of about 380 nm or below.

38. A method in accordance with claim 37, wherein the ultraviolet light-absorbing compound is included in an amount of about 0.04% to about 0.4% by weight of the composition.

39. A method in accordance with claim 38, wherein the ultraviolet light-absorbing compound is included in an amount of about 0.15% to about 0.3% by weight of the composition.

40. A method in accordance with claim 29, wherein the photoinitiator is active at a wavelength in the range of about 380 nm to about 550 nm.

41. A method in accordance with claim 40, wherein the photoinitiator is active at a wavelength in the range of about 380 nm to about 450 nm.

42. A method in accordance with claim 29, wherein the cross-linking agent comprises an allylic ester monomer selected from the group consisting of diallyl phthalate, diethylene glycol bis(allyl carbonate), triallyl cyanurate, diallyl diphenate and mixtures thereof.

43. A method in accordance with claim 42, wherein the photoinitiator comprises about 0.01% to about 2% by weight of the composition.

44. The method of claim 29, wherein the cross-linking agent is selected from the group consisting of styrene; an allylic ester monomer; an acrylate monomer; an acrylate oligomer; and mixtures thereof.

45. A method in accordance with claim 44, wherein the cross-linking agent comprises about 1% to about 45% by weight styrene; about 1% to about 15% by weight of an allylic ester monomer; and about 1% to about 35% by weight of an acrylate selected from the group consisting of an acrylate monomer, an acrylate oligomer, and mixtures thereof.

46. A method in accordance with claim 29, wherein the cross-linking agent comprises an acrylate selected from the group consisting of an acrylate monomer, an acrylate oligomer having a weight average molecular weight below about 1,000, and mixtures thereof.

47. A method in accordance with claim 46, wherein the photoinitiator comprises about 0.01% to about 2% by weight of the total composition.

48. A method in accordance with claim 29, wherein the photoinitiator comprises about 0.01% to about 2% by weight of the total composition.

49. A method in accordance with claim 29, wherein the composition includes 0.01% to 10% of an exotherm depressant.

50. A method in accordance with claim 49, wherein the exotherm depressant is selected from the group consisting of alpha-methyl styrene; terpinolene; gamma-terpinene; dilauryl thiopropionate; 4-tert-butylpyrocatechol; 3-methylcatechol; and mixtures thereof.

51. A method in accordance with claim 29, wherein the composition includes both allylic ester and acrylate cross-linking agents in a total amount of allylic ester and acrylate of about 1% to about 50% by weight.

52. A method in accordance with claim 51, wherein the allylic ester monomer cross-linking agent is present in an amount of about 1% to about 15% by weight, and the acrylate cross-linking agent is present in the composition in an amount of about 1% to about 35% based on the total weight of the composition.

53. A method in accordance with claim 52, wherein the acrylate is selected from the group consisting of a mono-, di-, tri-, tetra-, and penta-acrylate or methacrylate, and mixtures thereof.

54. A method in accordance with claim 53, wherein the acrylate is selected from the group consisting of methyl methacrylate; ethyl acrylate; cyclohexyl methacrylate; 2-hydroxyethyl methacrylate; 3-hydroxypropyl acrylate; alpha-bromoethyl acrylate; alpha-chloroethyl acrylate; chloromethyl methacrylate; 2-bromethyl methacrylate; 2-naphthyl methacrylate; para-tolyl acrylate; para-chlorophenyl methacrylate; meta-bromophenyl acrylate; 2,4,6-tribromophenyl acrylate; para-chlorobenzyl methacrylate; meta-methoxybenzyl methacrylate; para-ethylbenzyl acrylate; 1,6 hexanediol dimethacrylate; neopentyl glycol diacrylate; thiodiethylene glycol dimethacrylate; ethoxylated bisphenol A diacrylate; ethoxylated bisphenol A dimethacrylate; pentaerythritol triacrylate; glyceryl triacrylate; dipentaerythritol pentaacrylate; trimethylolpropane triacrylate; tris (2-hydroxy ethyl) isocyanurate trimethacrylate; trimethylolpropane polyoxyethylene triacrylate; a urethane acrylate; a urethane methacrylate; bis(4-methacryloylthiophenyl) sulfide; an ethylene glycol or a polyethylene glycol selected from the group consisting of acrylate, methacrylate, diacrylate, dimethacrylate, and mixtures thereof.

55. A method in accordance with claim 54, wherein the acrylate is a monomer selected from the group consisting of methyl methacrylate; an ethylene glycol or a polyethylene glycol selected from the group consisting of acrylate, methacrylate, diacrylate, dimethacrylate, and mixtures thereof; 1,6 hexanediol diacrylate; ethoxylated bisphenol A diacrylate; ethoxylated bisphenol A dimethacrylate; trimethylolpropane polyoxyethylene triacrylate; dipentaerythritol pentaacrylate; bis(4-methacryoylthiophenyl) sulfide; and mixtures thereof.

56. A method in accordance with claim 29, wherein the unsaturated polyester resin is formed by the reaction of an acid or anhydride selected from the group consisting of phthalic acid, isophthalic acid, maleic acid, phthalic anhydride, maleic anhydride, and mixtures thereof, with a polyol selected from the group consisting of ethylene glycol, propylene glycol, diethylene glycol, dipropylene glycol, neopentyl glycol, and mixtures thereof.

57. A method in accordance with claim 56, wherein the unsaturated polyester has a number average molecular weight in the range of about 1,500 to about 4,000.

58. A method of manufacturing an ophthalmic lens having an index of refraction of at least 1.50 comprising casting, within a mold cavity, a composition comprising:
   about 40% to about 95% by weight of said composition being a mixture of an unsaturated polyester resin and a diluent monomer cross-linking agent for said polyester resin;
   an allylic ester monomer in an amount of about 1% to about 15% by weight;
   about 1% to about 35% by weight of an acrylate selected from the group consisting of an acrylate monomer, an acrylate oligomer, and mixtures thereof; and
   an effective amount of a photoinitiator, capable of gelling the polyester in about 7 minutes or less and capable of curing the unsaturated polyester in about 3 hours or less when the combination of said unsaturated polyester and the photoinitiator are exposed to a light intensity sufficient to gel the polyester resin in about 7 minutes or less;
   contacting the composition with a light source having an intensity sufficient to gel the composition in about 7 minutes or less, to photocure, polymerize and cross-link the composition.

59. A method in accordance with claim 58, wherein the diluent monomer cross-linking agent comprises about 10% to about 45% by weight of the mixture of unsaturated polyester resin and diluent monomer.

60. The method in accordance with claim 59, wherein the allylic ester monomer comprises diallyl phthalate in an amount of about 2% to about 10%, based on the total weight of the composition; wherein the acrylate is an ethylene glycol or a polyethylene glycol selected from the group consisting of an acrylate, a methacrylate, a diacrylate, dimethacrylate, and mixtures thereof, including about 1% to about 6% methyl methacrylate, based on the total weight of the composition; and wherein the polymerization initiator is included in the composition in an amount of about 0.01% to about 2% based on the total weight of the composition.

61. A method in accordance with claim 59, further including 0.01% to about 10% by weight of the composition of alpha-methyl styrene, and wherein the diluent monomer cross-linking agent comprises styrene.

62. The method of claim 58, wherein the photoinitiator has activity above about 380 nm.

63. A method in accordance with claim 62, wherein the photoinitiator is active at a wavelength in the range of about 380 nm to about 450 nm.

64. The method of claim 63, wherein the photoinitiator is selected from the group consisting of α-hydroxy ketones, phosphine oxides, and mixtures thereof.

65. A method in accordance with claim 58, wherein the photoinitiator is selected from the group consisting of 2,4,6-trimethylbenzoyldiphenylphosphine oxide; ethyl 2,4,6-tiimethylbenzoylphenylphosphinate; bis(2,6-dimethoxybenzoyl)-2-4-,4-trimethylpentyl phosphine oxide; bis(2,4,6-trimethylbenzoyl) phenyl phosphine oxide; 1-hydroxycyclohexyl phenyl ketone; 2-hydroxy-2-methyl-1-phenyl-propan-1-one; and mixtures thereof.

66. A method in accordance with claim 58, wherein the photoinitiator is a mixture of 10–90% by weight bis(2,6-dimethoxybenzoyl)-2-4-,4-trinethylpentyl phosphine oxide; and 10–90% by weight of a ketone selected from group consisting of 1-hydroxycyclohexyl phenyl ketone, 2-hydroxy-2-methyl-1-phenyl-propane-1-one, and mixtures thereof, based on the total weight of photoinitiators in the composition.

67. A method in accordance with claim 58, wherein the light source has an intensity of at least about 300 microwatts/cm$^2$.

68. A method in accordance with claim 67, wherein the light source has an intensity in the range of about 500 microwatts/cm$^2$ to about 10,000 microwatts/cm$^2$.

69. A method in accordance with claim 68, wherein the light source has an intensity in the range of about 1,500–7,000 microwatts/cm$^2$.

70. A method in accordance with claim 58, wherein the composition further includes an ultraviolet light-absorbing compound capable of absorbing light having a wavelength of about 380 nm or below, and the lens has improved color.

71. A method in accordance with claim 58, wherein the photoinitiator is active at a wavelength in the range of about 380 nm to about 550 nm.

72. A method of improving vision of an object by a human eye comprising disposing between the eye and the object the ophthalmic lens manufactured by the method of claim 58.

* * * * *